United States Patent [19]
Kostizak et al.

[11] Patent Number: 5,701,175
[45] Date of Patent: Dec. 23, 1997

[54] SPECTROPHOTOMETER MOUSE

[76] Inventors: David A. Kostizak, 21 Hill Creek Rd., Rochester, N.Y. 14625; James M. Zavislan, 5 Wandering Trail, Pittsford, N.Y. 14534

[21] Appl. No.: 691,620

[22] Filed: Aug. 2, 1996

[51] Int. Cl.$^6$ .................................................. G01J 3/28
[52] U.S. Cl. ................................... 356/326; 356/402
[58] Field of Search .......................... 356/319, 326, 356/328, 402; 345/165, 166; 364/526

[56] References Cited

U.S. PATENT DOCUMENTS

| | | | |
|---|---|---|---|
| 3,684,868 | 8/1972 | Christie et al. | 235/61.11 |
| 5,132,673 | 7/1992 | Ciavarella et al. | 345/166 |
| 5,272,518 | 12/1993 | Vincent . | |
| 5,319,437 | 6/1994 | Van Aken et al. . | |
| 5,359,185 | 10/1994 | Hanson | 235/472 |
| 5,448,050 | 9/1995 | Kositzak . | |
| 5,468,950 | 11/1995 | Hanson | 235/471 |

*Primary Examiner*—Frank G. Font
*Assistant Examiner*—Zandra V. Smith

[57] ABSTRACT

A spectrophotometer mouse is provided for making color spectrum measurements of desired areas on a surface over which the mouse is movable. The spectrophotometer mouse includes a housing shaped to conform to the hand of an operator, and a spectrophotometer in the housing having an input (such as a light receiving aperture) for measuring the color spectrum of the target area on the surface. The mouse has a position sensing encoder which is coupled to a programmed computer for identifying the position of the mouse on the surface. This programmed computer may be internal or external of the housing. The computer is used for locating the target area on the surface with reference to a pointer on the mouse, and then detecting when an operator has moved the mouse such that the input of the spectrophotometer is substantially coincident with the located target area. The computer automatically actuates the spectrophotometer so that the spectrum of the light from the target area is received at the input of the spectrophotometer and is measured. In addition to providing color spectrum measurements of target areas on a surface, the position sensing features of the mouse can also be operated as a typical computer-type mouse for command input to a graphical user interface. Thus, the operator can use the spectrophotometer mouse to measuring the color spectrum of target areas on the surface, or as a typical computer-type mouse.

40 Claims, 6 Drawing Sheets

SPECTROPHOTOMETER MOUSE

FIELD OF THE INVENTION

The present invention relates to an improved method, system, and apparatus for spectrophotometry, and particularly to a spectrophotometer mouse for making color spectrum measurements of areas on a surface over which the mouse is movable without direct observation of such areas but with an assurance that the mouse is positioned for spectral measurements at the areas.

BACKGROUND OF THE INVENTION

Spectrophotometers may be used to measure the color spectrum of areas on the surface of flat objects, such as paper, paint chips, or fabric swatches. The color information provided is useful for color matching between different objects or in color quality control. It is important in making such color spectrum measurements that the area being measured by the spectrophotometer is the same area when viewed by the operator of the spectrophotometer. In other words, the operator must be assured that the spectrophotometer's light entry aperture is targeted at a desired area on an object such that the measured results are both reliable and accurate. Once properly targeted, the spectrophotometer can then be actuated by the operator to make a measurement. A device operative as a spectrophotometer mouse is shown in U.S. Pat. No. 5,272,518 issued to Vincent on Dec. 21, 1993. This device however does not give any assurance where a surface measurement will be made by its spectrophotometer.

Examples of the above described spectrophotometers are available from X-Rite, Inc. of Grandville, Mich. and Lightsource, Inc. of San Rafael, Calif. The Lightsource spectrophotometers have a foot which is hingedly connected to a larger unit. In operation, the foot is rotated open from the unit and an opening (or ring) in the foot is placed over the area on the surface of the object to be measured. The unit is then rotated closed over the foot which triggers the spectrophotometer in the unit to take a measurement. When the spectrophotometer is triggered, the spectrophotometer's aperture is targeted to the area defined by the opening of the foot. These spectrophotometers must be manually actuated when positioned over a target area on an object.

SUMMARY OF THE INVENTION

Accordingly, it is an object of the present invention to provide an improved spectrophotometer mouse for making color spectrum measurements of target areas on a surface over which the spectrophotometer mouse transverses, in which the mouse provides position sensing to accurately and reliably position a light receiving input of the spectrophotometer coincident with the target areas, thereby making it unnecessary for direct operator observation of target areas when the spectrophotometer input is so positioned.

It is another object of the present invention to provide an improved system, method, and apparatus for making color spectrum measurements of target areas on a surface with a spectrophotometer mouse which can be transverse over the surface and in which the spectrophotometer in the mouse is automatically actuated after the mouse has been moved by an operator to a position where the light receiving input of the spectrophotometer substantially coincides with a preselected target area.

It is still further an object of the present invention to provide an improved system, method, and apparatus including or using a spectrophotometer mouse for making color spectrum measurements of target areas on a surface over which a spectrophotometer mouse transverses, in which the mouse has position sensing features which can operate as a typical computer-type mouse for command input to a graphical user interface. Thus, an operator can use the mouse for measuring the color spectrum of target areas on the surface, or as a typical computer-type mouse.

Briefly described, the invention may be embodied in a spectrophotometer mouse for making color spectrum measurements of desired areas on a surface over which the mouse is movable. The spectrophotometer mouse includes a housing shaped to conform to the hand of an operator, means for identifying the position of the mouse on the surface, and a spectrophotometer in the housing having an input (e.g., a light entry aperture) for measuring the color spectrum of the target area on the surface. Further provided in the spectrophotometer mouse are means for locating the target area on the surface, and means for detecting when the operator has moved the mouse such that the input of the spectrophotometer is substantially coincident with the located target area. Both the locating and detecting means are preferably provided by a programmed computer internal or external of the housing, and operate responsive to information provided from the position identifying means (which may be provided by a position sensing encoder in the mouse coupled to the computer). In addition, means may be provided responsive to the detecting means for automatically actuating the spectrophotometer when the input of the spectrophotometer is substantially coincident with the target area.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1A:
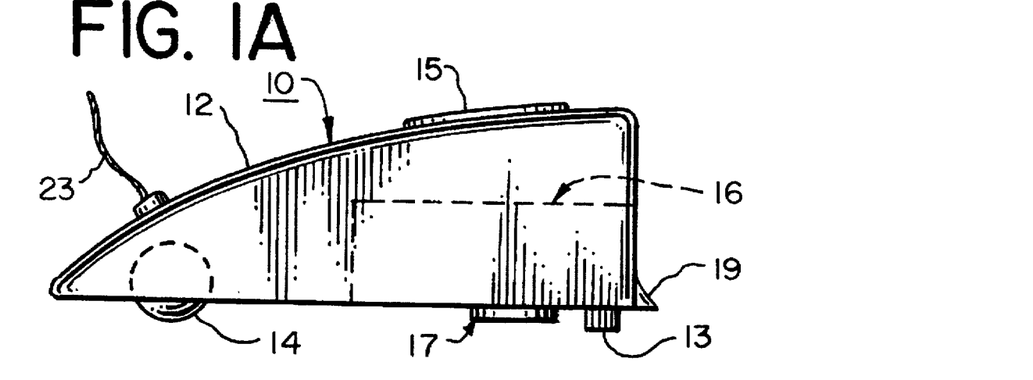
FIG. 1A is a side-view of a spectrophotometer mouse embodying the invention.
Figure 1B:
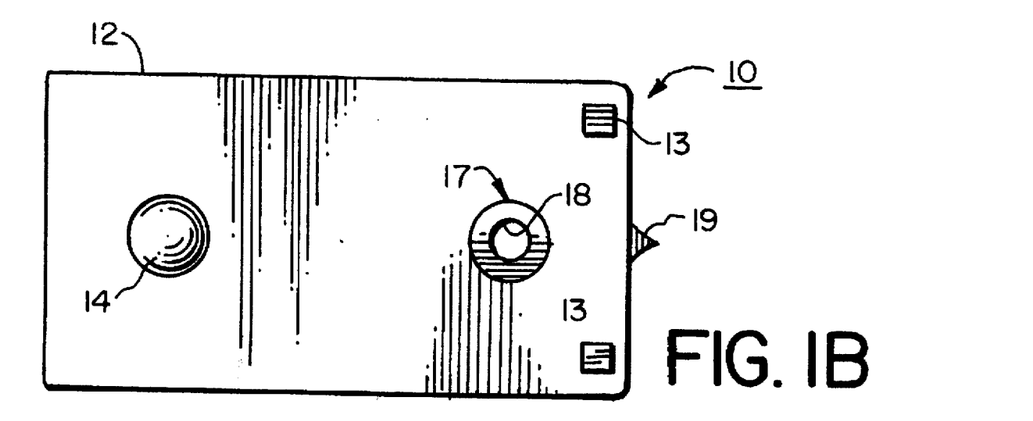
FIG. 1B is a plan-view of the bottom of the spectrophotometer mouse shown in FIG. 1A.
Figure 1C:
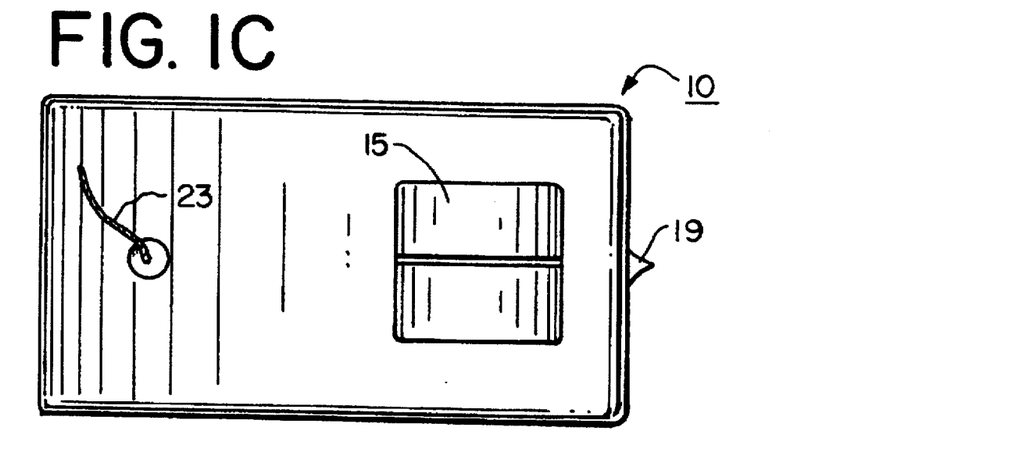
FIG. 1C is a plan-view of the top of the spectrophotometer mouse shown in FIG. 1A.

Referring to FIGS. 1A, 1B and 1C, a spectrophotometer mouse 10 is shown with a housing 12 having a shape which conforms to an operator's hand, much like the shape of a typical computer mouse. Mouse 10 is movable upon the surface of any object (not shown) which is a nominally flat, such as paper, a paint chip, or a fabric swatch. In housing 12 is an encoder ball assembly 14, such as commonly used in a computer mouse, and a spectrophotometer 16. Spectrophotometer 16 may be one as described in U.S. patent application Ser. No. 08/210,806, filed Mar. 18, 1994, assigned to same assignee as this application or the spectrophotometer components described in Van Aken et al., U.S. Pat. No. 5,319,437, issued Jul. 7, 1994. In the alterative, spectrophotometer 16 may be replaced by other devices to perform different types of surface measurements, for instance, a densitometer may be used as shown in Berg et al., U.S. Pat. No. 5,015,098, issued May 14, 1991, or a colorimeter for measuring color in a color coordinate system, such as XYZ. An input to spectrophotometer 16 is provided by an aperture 18.

A port 17 in housing 12 faces the surface over which mouse 10 transverses. Port 17 is an entrance port for light which enters spectrophotometer 16 via aperture 18. Skid plates 13 made of low coefficient of friction material, such as high molecular weight polyethylene, are positioned on either side of port 17 to hold port 17 off the surface while allowing the mouse to slide easily over the surface. Skid plates 13 assist the operator in positioning mouse 10 over the surface, especially when the surface is smaller than the width of the mouse or is non-planar.

The housing 12 has an indicator, such as external pointer 19. Pointer 19, although shown at the front of mouse 10, may be located anywhere on housing 12 in fixed relationship with port 17 and encoder ball 14. Pointer 19 may be an integral part of housing 12. Housing 12 may be molded from plastic.

Mouse 10 may be connected or tethered, like a typical computer mouse, to a computer (not shown) by means of a wire, line or cord 23, or by an RF, optical, or infrared link (tetherless coupling). The computer may be a standard personal computer having peripherals including a keyboard and a display screen (not shown). Switches 15 on housing 12 are provided to allow an operator to provide signals to the computer from mouse 10. The computer may also be internal of housing 12.

Spectrophotometer 16 in housing 12 provides a means for measuring the color spectrum, or components thereof, at areas on which the surface mouse 10 moves. The measurement being made in response to light at aperture 18 through port 17. The light received through port 17 can either be reflected from the surface (where the surface is illuminated by a light source in the spectrophotometer), transmitted through the surface (wherein the underside of the surface is illuminated by an illumination means), or luminescent (radiated from the surface). Operation of the spectrophotometer 16 to make a measurement is preferably controlled by the above mentioned computer. Software in the computer may provide processing of signals received from spectrophotometer 16 reflecting measurement results.

Encoder ball 14 is part of a conventional position sensing encoder which interfaces with the computer. The computer operates in accordance with data representing instructions programmed in the software thereof to track the position of mouse 10 relative to the surface which encoder ball 14 transverses and to correlate mouse 10 movement and position to cursor movement and position on the display screen of the computer. Other types of position sensing means are within the scope of this invention, for example, the surface may lie over an embedded grid on a tablet with a sensor coil on the mouse response to grid location, or a mechanical x-y assembly may be used instead of an encoder ball. Also, the position sensing means may be a wheel with radial detents, and a microswitch which actuates with each movement of the detent as the wheel rotates upon the surface to provide finite measures of displacement to the computer. The position sensing encoder (encoder ball 14) functions with the computer as a means for identifying the position of mouse 10 on the surface, thereby providing information about mouse position. As will be shown below, the computer also operates as a detecting means by using the information about mouse position to find when light from a target area on the surface can enter the input of the spectrophotometer 16 for spectral measurement.

Figure 2:
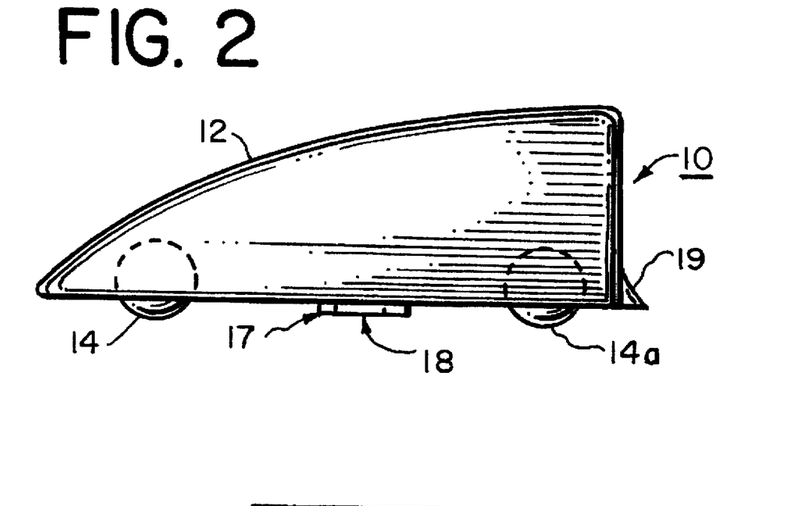
FIG. 2 is a side-view of the spectrophotometer mouse, such as shown in FIG. 1A, but having two encoder balls.
Figure 3A:
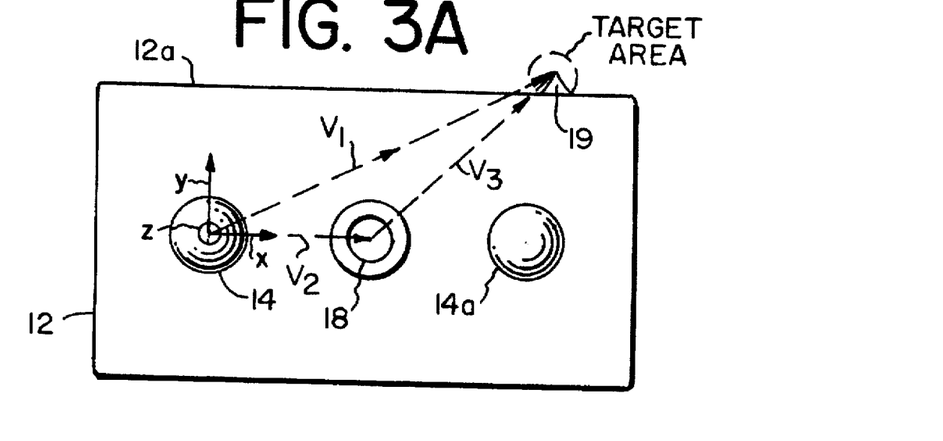
FIGS. 3A, 3B and 3C are plan-views of the bottom of the spectrophotometer mouse, such as shown in FIG. 2, illustrating exemplary vectors.

In the preferred embodiment, the position sensing encoder include an additional encoder ball 14a spaced apart from encoder ball 14, as shown in FIGS. 2 and 3A–3C. Encoder ball 14a is similar to encoder ball 14 in that they both provide position sensing to the computer in an x,y coordinate system as they rotate upon the surface. This coordinate system is shown for example in FIG. 3A based on orthogonal x and y axes centered through encoder ball 14. Both encoder ball 14 and 14a operate independently from each other, and can be linearly centered with pointer 19 in housing 19, but need not be so, such as shown in FIG. 3A. The computer receives the x,y positions of both encoder balls 14 and 14a, and uses it to calculate changes in the rotational position, θz, of the center of encoder ball 14 with respect to housing 12 as housing 12 moves upon the surface, where θz represents the angular change about a z-axis centered through encoder ball 14 perpendicular with the surface (i.e., the z-axis is orthogonal to both x and y axes, as shown in FIG. 3A). In this manner, the rotational position of housing 12 with respect to the surface is determined. Thus, the position sensing encoder (encoder balls 14 and 14a) with the computer provides information about mouse position in terms of either the position of encoder ball 14 or 14a, or both, and also the rotational position θz about the above defined z-axis. Optionally, this rotation position could be determined about encoder ball 14a.

One advantage provided by using two encoder balls is that accuracy in locating areas on the surface may be improved by sensing out-of-balance rotation in one of the encoder balls, such as caused by ball slippage on the surface. Out-of-balance rotation of one of the encoder balls may be determined by detecting apparent changes in the known distance between encoder balls. The operator could then be alerted to the out-of-balance condition and corrective action can then be taken. Furthermore, the greater the distance between the two balls 14,14a in housing 12, the more sensitive mouse 10 is to detecting changes in the rotational position of encoder ball 14 with respect to housing 12.

The operation of mouse 10 with the two encoder balls 14 and 14a of FIG. 2 is as follows: To start, mouse 10 operates as a reference position finder by first locating a target area on the surface at which a spectral measurement is to be made. To locate a target area, an operator positions mouse 10 over a surface such that pointer 19 is directed and adjacent to the target area. The operator hits one of switches 15 on mouse 10, often called clicking the mouse. This tells the computer that a measurement is desired at the target area. The target area represents a region on the surface roughly equal to the size of aperture 18 of spectrophotometer 16. Next, the computer sets the x,y position of encoder ball 14 and computes θz to determine the reference mouse position, thus providing an absolute position sensing encoder, or the position sensing encoder may be a relative position sensing encoder. As a relative encoder, the computer resets accumulators for the x and y values of encoder ball 14 to zero and resets θz to zero. Based on the reference mouse position, i.e. position of encoder ball 14 and θz, the computer can determine a vector from ball 14 to pointer 19 over the target area. FIG. 3A shows a representation of this vector as $V_1$ for the case where pointer 19 is located on side 12a of housing 12. $V_1$ can be determined since encoder ball 14, and also ball 14a, are in a fixed geometric relationship in housing 10 with pointer 19 over the target area.

Next, the computer determines another vector, shown as $V_2$ in FIG. 3A, from encoder ball 14 to aperture 18, which is also in a fixed geometric relationship in housing 10 with encoder ball 14, and also ball 14a. Based on vectors $V_1$ and $V_2$, the computer then determines a vector $V_3$ from aperture 18 to pointer 19 over the target area. These vectors $V_1$, $V_2$ and $V_3$ remain fixed for the measurement of the selected target area, which is shown as a dashed circle in FIG. 3A.

Figure 3B:
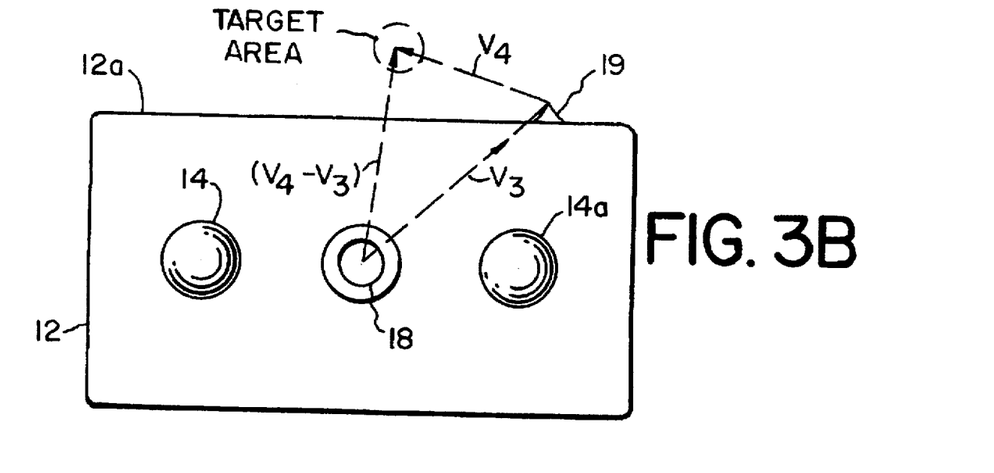
Figure 3C:
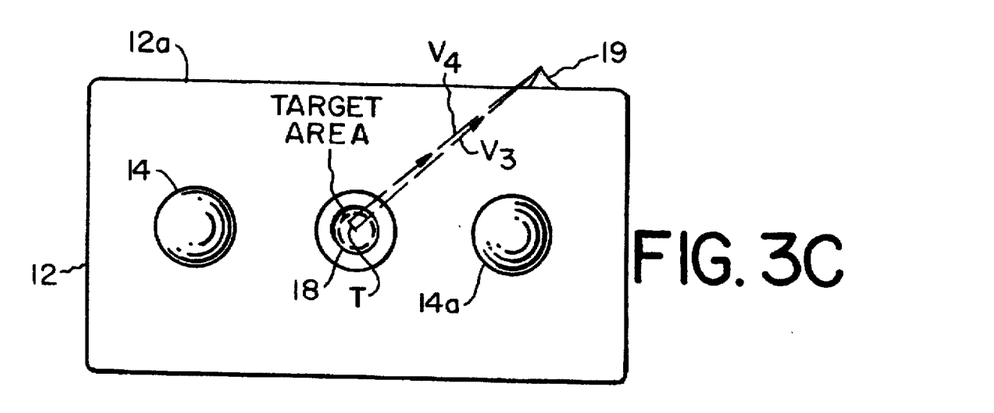

FIG. 3B shows an example of the position of the target area relative to housing 12 as the operator moves mouse 10 from its position shown in FIG. 3A. The computer determines a vector $V_4$ from pointer 19 to the target area. Initially when the target area is selected, as shown in FIG. 3A, vector $V_4$ is zero. The difference between vectors $V_4$ and $V_3$ ($V_4-V_3$) represents the residual vector or trajectory to aperture 19 from the target area.

After the operator has selected the target area, the display of the computer shows representations of the position of the mouse in terms of vector ($V_4-V_3$) and the location of aperture 18 with respect to the reference position established earlier. Also the display shows a representation of the target on the surface relative to the same reference position. The computer updates the position of mouse 10 on the display as mouse 10 is moved by the operator. In this manner, the computer communicates to the operator where mouse 10 is on the surface relative to the target area position. Any representation suitable to facilitate the operator in moving mouse 10 to locate aperture 18 over the target area may be used. The display may be similar to those of CAD/CAM software, or have a grid. For example, a line may be drawn on the display between the positions of the aperture 18 and the target area to provide a representation of vector ($V_4-V_3$), such that as mouse 10 is moved closer to the target area this line shortens.

The operator uses the display to guide the path of mouse 10 to locate the input of the spectrophotometer 16, i.e., aperture 18, over the target area without lifting mouse 10 off the surface. The computer tracks the movement of mouse 10 along this path by updating vector ($V_4-V_3$) between aperture 18 and the target area. As the operator moves mouse 10 along this path, the computer detects the rotation of encoder balls 14 and 14a, revises the mouse 10 position accordingly (i.e., vector $V_4-V_3$ and the location of aperture 18), and displays the revised position. The display provides a visual aid to positioning mouse 10, which is needed because as aperture 18 of mouse 10 approaches the target area housing 12 blocks direct operator observation of the target area. Other visual aids, such as LEDs or LCD, could also be placed directly on mouse 10 to show direction and/or distance to the target area.

When the operator has moved aperture 18 over the target area within a predefined tolerance, T, for e.g., 0–3 millimeters, of the target area (i.e., where the input of spectrophotometer 16 is substantially coincident with the target area), the computer detects this and automatically actuates spectrophotometer 16 to measure the color spectrum of the surface at the target area. This is shown for example in FIG. 3C which illustrates mouse 10 moved by operator from its position in FIG. 3A. The computer detects when aperture 18 has been moved over the target area if vector ($V_4-V_3$) has decreased to within the predefined tolerance, T, i.e., where $(V_4-V_3) \pm T \leq 0$. After the spectrophotometer is automatically actuated, the computer alerts the operator when spectrophotometer 16 is either measuring the spectrum or has completed measuring, or both.

Once the spectral measurement is successfully taken, mouse 10 can reset for the next measurement, or the operator can change mouse 10 operation to that of a typical computer-type mouse for command input to a graphical user interface on a display, by utilizing only the position identifying features provided by the position sensing encoder of the mouse coupled to the computer. Thus, mouse 10 can function as either a typical computer-type mouse, or provide color spectrum measurement of target areas. This is useful in desktop publishing applications because mouse 10 can be used with page design software as both a computer-type mouse and as a color input device when surface measurements are needed.

In addition, as a spectrophotometer mouse, the above operation of mouse 10 describes a mode of operation where spectrophotometer 16 is automatically actuated, however in another mode, spectrophotometer 16 may be actuated manually by an operator hitting one of switches 15 on mouse 10 after the computer has communicated to the operator that the when aperture 18 of mouse 10 has been moved to the target area within the predefined tolerance. Mouse 10 may be operated in either mode based on operator preference.

In one embodiment of the spectrophotometer mouse, an auditory signal, such as a beep, or a visual signal via the computer display, may be used to communicate to the operator when aperture 18 has reached the target area within the predefined tolerance and that no further movement of mouse 10 is necessary. After the beep, spectrophotometer 16 is automatically actuated. In another embodiment, an auditory signal changes in frequency and/or beat to communicate to the operator the distance of mouse 10 to the target area. In still a further embodiment, or in combination with the above two embodiments, the computer automatically clears the targeting of mouse 10 when mouse 10 has moved beyond a set threshold distance from the target area, or has not reached the target area within a timed period, or the operator otherwise uses mouse 10 or keyboard of the computer, or when the direction of vector $V_4$ (see FIGS. 3B–3C) is substantially in a direction opposite of vector $V_3$.

Figure 4:
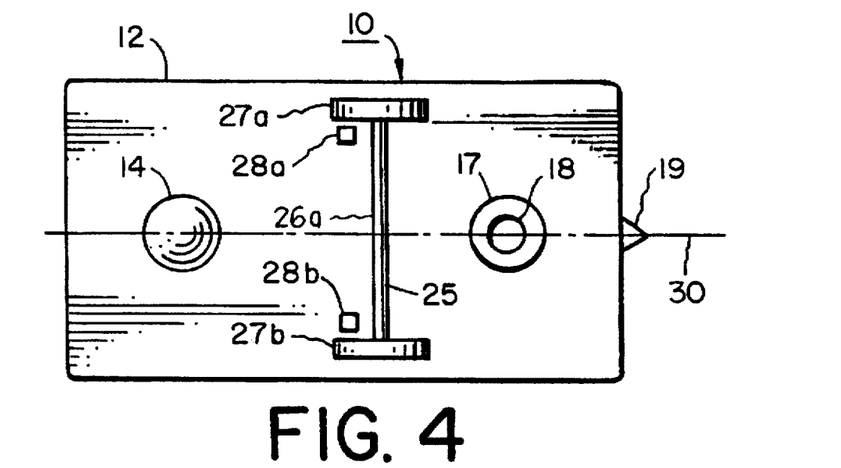
FIG. 4 is a plan-view of the bottom of the spectrophotometer mouse, such as shown in FIG. 1B, having a wheel assembly.

The following discussion relates to further and additional embodiments for mouse 10:

As a first embodiment, the position sensing encoder in mouse 10 may be provided by using a single encoder ball 14 of FIGS. 1A–C and a wheel assembly 26a shown in FIG. 4. Wheel assembly 26a is located on housing 12 to allow two parallel wheels 27a and 27b to contact the surface mouse 10 transverses. Wheels 27a and 27b rotate independently from each other and are coupled by axle 25. Each wheel 27a, 27b has a sensor 28a, 28b for providing signals to the computer for measuring rotational displacement of their respective wheel. The computer uses detected rotational displacement via signals from sensors 28a, 28b to calculate the angular rotation θz of housing 12 about ball 14, as defined earlier above, via differences between rotational displacements of each wheel 27a and 27b Optionally, only one of sensors 28a and 28b is needed to calculate θz, but preferably two sensors are used to improve accuracy. In this first embodiment, pointer 19, aperture 18 and ball 14 are located in housing 12 centered along a common virtual line 30, which is perpendicular to axle 25 when the target area is selected.

Operation of mouse 10 with wheel assembly 26a is the same as described above for mouse 10 with two encoder balls, except tracking mouse 10 movement and determining target area position is as follows: To determine the target area position, when the operator hits one of switches 15 to select the target area the position of ball 14 is set as the reference position with θz=0. As the operator begins to move mouse 10 to position aperture 18 substantially over the target area, a model of line 30 is determined by the computer. This model is based upon the reference position and at least one other x,y position of ball 14. The later position(s) must account for changes in θz due to non-linear movement of mouse 10 by the operator. The target area position is calculated along this line model since ball 14 at the reference position is a fixed linear distance away the target area indicated by pointer 19. The computer then calculates vectors between ball 14, aperture 18 and the target area, as described above, except θz is provided by wheels 27a and 27b, rather then by second encoder ball 14a (FIG. 2).

Figure 5:
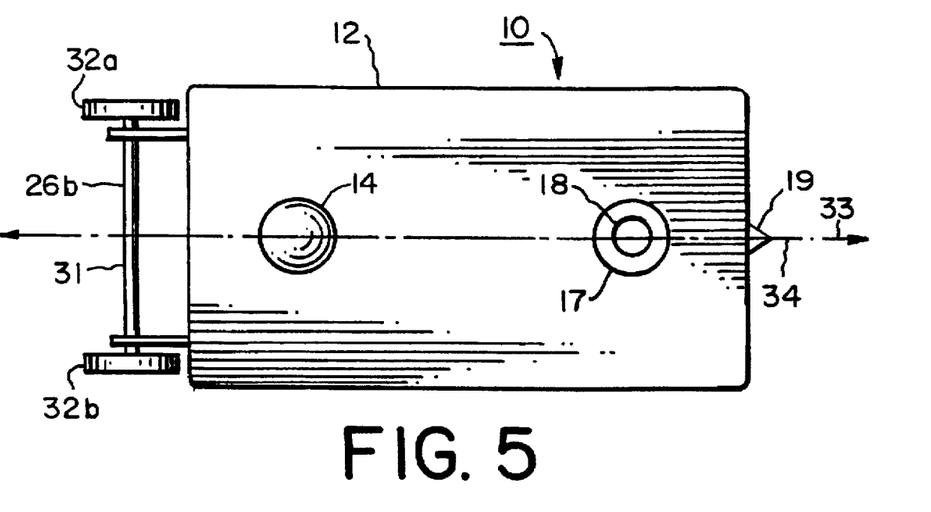
FIG. 5 is a plan-view of the bottom of the spectrophotometer mouse, such as shown in FIG. 1B, having another wheel assembly.

In a second embodiment, the position sensing encoder in mouse 10 may be provided by using a single encoder ball 14 of FIGS. 1A–C and a wheel assembly 26b shown in FIG. 5. Wheel assembly 26b is pivotally mounted on housing 12 to allow wheels 32a and 32b to contact (or engage) the surface over which mouse 10 transverses, and to move away from the surface when not needed. Wheels 32a, 32b are fixed to an axle 31 and do not rotate independently from each other. When contacting the surface, wheels 32a,32b limit the motion of mouse 10, i.e., ball 14, along a virtual line 34. Aperture 18 and pointer 19 are situated in housing 12 centered along virtual line 34 at fixed distances from ball 14. Wheel assembly 26b may be placed on the front or back of housing 12, or in a space provided underneath housing 12. Although two wheels 32a,32b are shown, additional wheels or a single wheel of sufficient size may be used to limit motion. Also, other means substantially limiting motion of mouse 10 in a linear direction may be used instead of wheel assembly 26, such as later described in connection with FIGS. 6A–C. Furthermore, mouse 10 may have a switch to allow the computer to detect if wheels 32a,32b are in proper position to engage the surface. It should be noted that wheel assembly 26b could be part of the earlier mentioned wheel with radial detents which may operate with the computer to provide position sensing of mouse 10 on the surface.

Operation of mouse 10 with wheel assembly 26b is the same as described above for mouse 10 with two encoder balls, except that the operator engages wheel assembly 26b with the surface prior to the hitting of the switch which tells the computer that a measurement is desired at the target area. However, since aperture 18 and pointer 19 lie along the same virtual line 34, the vector between aperture 18 and the pointer 19 simplifies to only distance. For example, in mouse 10 shown in FIG. 5, after selecting a target area, mouse 10 is moved linearly a distance equal to the distance between the pointer and the center of aperture 18, in the direction of arrow 33 to position aperture 18 within the predefined tolerance of the target area.

Figure 6A:
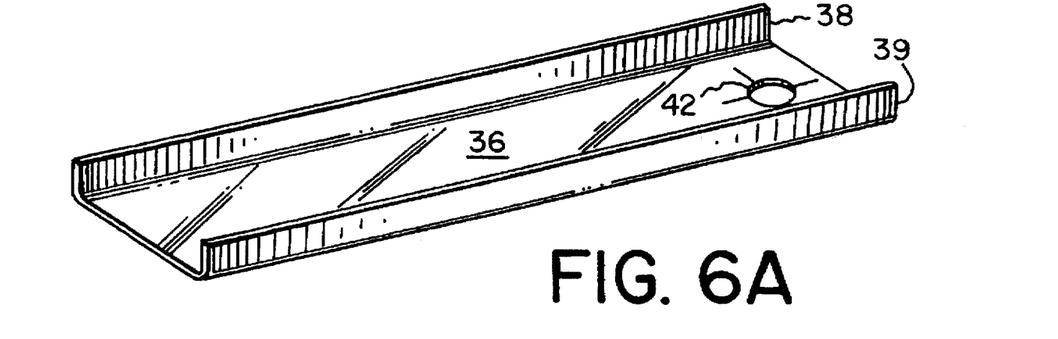
FIG. 6A is a perspective view of a tray for receiving the spectrophotometer mouse of FIGS. 1A–C.
Figure 6B:
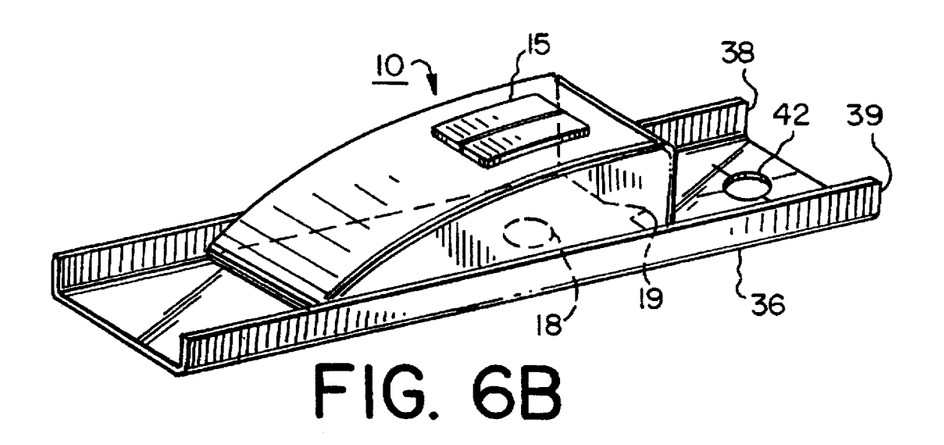
FIG. 6B is a perspective view of the tray of FIG. 6A receiving the spectrophotometer mouse of FIG. 1A–1C.
Figure 6C:
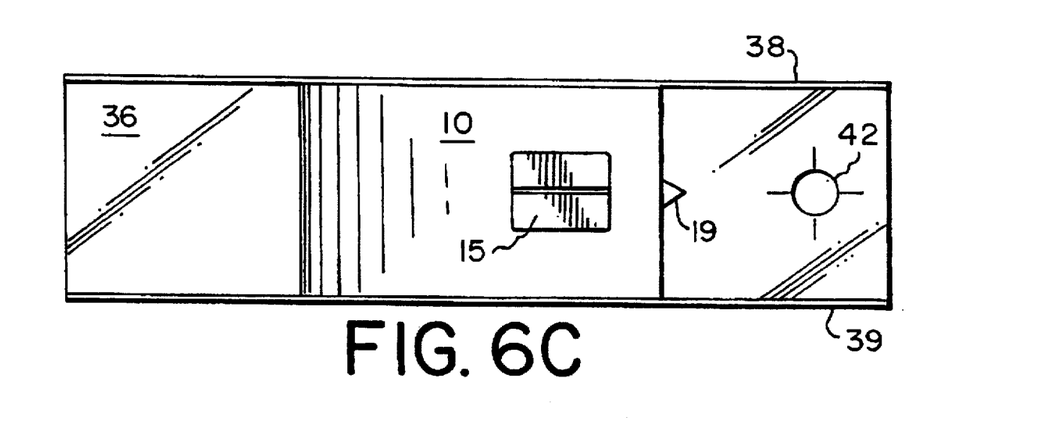
FIG. 6C is a plan-view of the top of the tray and spectrophotometer mouse of FIG. 6B.

In a third embodiment, a tray 36 shown in FIGS. 6A–C may be used with mouse 10 of FIGS. 1A–C to limit the movement of mouse 10 to a linear motion. Tray 36 has two parallel rails 38 and 39 spaced apart from each other. In FIGS. 6B–C, mouse 10 is received in tray 36 between rails 38 and 39. An aperture 42 is provided in tray 38 which is larger than the size of input of the spectrophotometer. Visual markings such as cross-hairs or an annular reticle can be provided to aid in positioning aperture 18 over the target area. Rails 38 and 39 define a linear path for mouse 10, and aperture 42 is positioned in tray 36 such that as mouse 10 moves along this path the input of the spectrophotometer, i.e. aperture 18, can coincide with aperture 42. As shown below, tray 36 is part of a mean for identifying mouse position with the position sensing encoder (encoder ball 14 of FIGS. 1A–C) and the computer. Tray 36 may be made of any rigid material, such as molded plastic, and preferably is sufficiently transparent to permit viewing of the surface through tray 36 by the operator when the tray 36 is laid on the surface.

The operation of mouse 10 with tray 36 is similar to that with wheel assembly 26b (FIG. 5) described earlier, except that instead on placing wheel assembly 26b in contact with the surface, the operator places tray 36 on the surface and positions aperture 42 of tray 36 such that the desired target area is visualized through aperture 42. With mouse 10 located between rails 38 and 39, the operator points pointer 19 to the target area through aperture 42 and hits one of switches 15 to select the target area. The tray remains fixed in position with respect to the surface as the operator moves mouse 10 along the linear path defined by rails 38 and 39 within a predefined tolerance (e.g., 0–3 mm) of a distance equal to the distance between the tip of pointer 19 and the center of aperture 18, i.e., where aperture 18 is substantially coincident with the target area. The computer tracks the movement of mouse 10 with respect to the position of encoder ball 14 when the target area was selected, i.e., the reference position, until aperture 18 is substantially coincident with the target area and the spectrophotometer has been actuated to successfully measure the target area.

Figure 7:
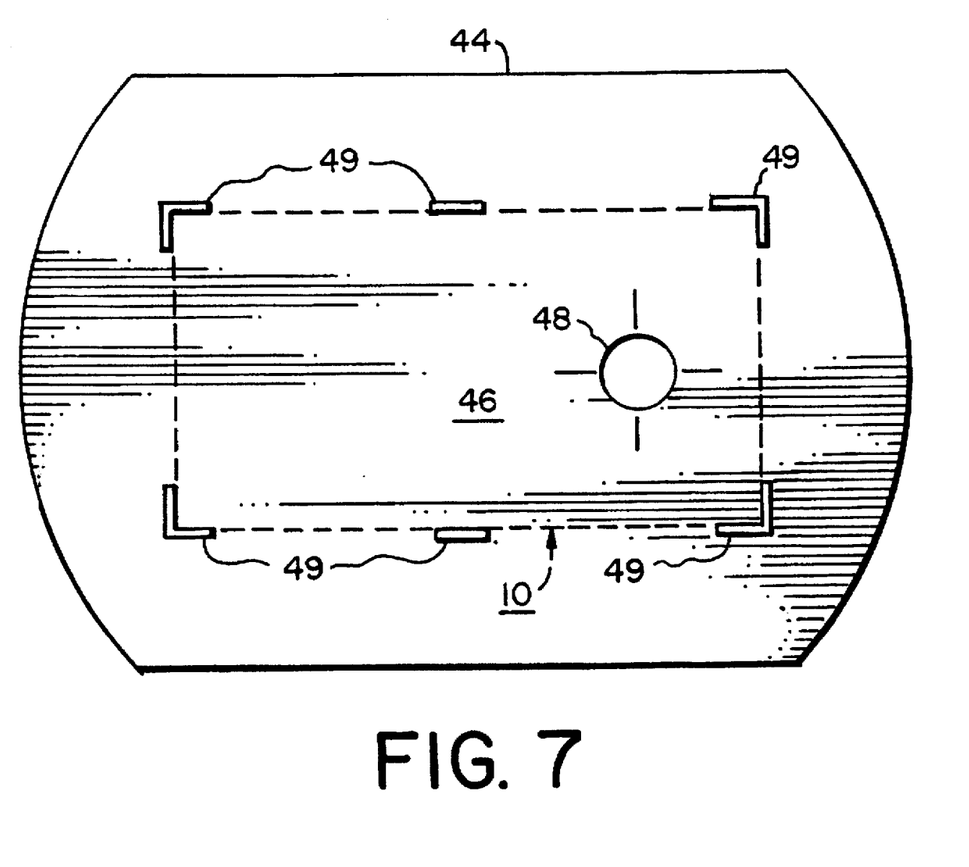
FIG. 7 is the plan-view of the top of a tray for receiving the spectrophotometer mouse of FIGS. 1A–C absent the pointer of the mouse.

A fourth embodiment is shown in FIG. 7, in which a tray 44 may be used with mouse 10 shown in FIGS. 1A–C without pointer 19. Tray 44 has an interior 46 shaped to receive mouse 10. An aperture 48 is provided in tray 44 which is about the same size as the input of the spectrophotometer. Aperture 48 is located in tray 44 at a position where it is coincident with the input when the mouse is located in interior 46. Visual markings such as cross-hairs or an annular reticle can be provided to aid in positioning aperture 48 over the target area. In operation, tray 44 is placed on the surface such that the desired target area is visualized through aperture 44. The tray remains fixed in position as mouse 10 is received in interior 46 of tray 44. Raised ridges 49 may be used to temporarily fix (index) mouse 10 position in interior 46, however other means may be used, such as a terraced interior 46. The operator then hits one of the switches 15 on mouse 10 to actuate the spectrophotometer to make a spectral measurement of the target area. Tray 44 is part of a means for identifying mouse position to the operator. Tray 44 may be made of any rigid material, such as molded plastic, and preferably is sufficiently transparent to permit viewing of the surface through tray 44 by the operator when the tray 44 is laid on the surface.

Figure 8:
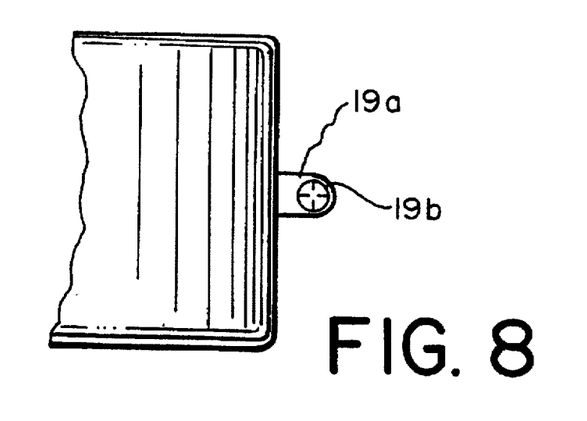
FIG. 8 is a fragmentary plan-view of the mouse, such as shown in FIG. 1A, but having another configuration of the pointer thereof.
Figure 9:
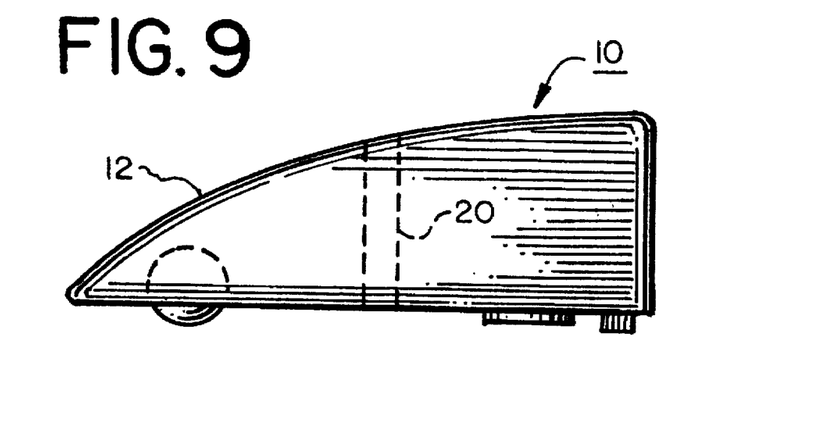
FIG. 9 is a fragmentary plan-view of the mouse, such as shown in FIG. 1A, but having still another configuration of the pointer thereof.

Referring to FIGS. 8 and 9, other configurations of pointer 19 are shown. In FIG. 8, a pointer may be provided by an external projection or tongue 19a from housing 12. Projection 19a is of a translucent material and has either cross-hair or circular indicia 19b, or both. The circular indicia can illustrate the size of the surface sample, i.e., the target area, to be measured by aperture 18. To select a target area, an operator aligns indicia 19b over the target area, and then hits the switch on mouse 10 which tells the computer where a measurement is desired. In FIG. 9, a pointer may be provided by a hole 20 through housing 12 through which an operator can visualize a target area, and then hit the switch on mouse 10 which tells the computer where a measurement is desired. As with pointer 19, projection 19a and hole 20 may also be located anywhere on housing 12 in fixed relationship with port 17 and encoder ball 14.

The spectrophotometer mouse described above is particularly suitable for automatic measuring of printer color calibration charts produced by a color printer in response to signals received from a computer coupled thereto. Such charts have multiple color patches which are spaced from each other in a predefined arrangement or geometry known to the computer. As shown below, the spectrophotometer mouse described in FIGS. 2, 4 or 5 can be used to obtain spectral measurements of these color patches by facilitating operator movement of mouse 10 to properly position the input of the spectrophotometer (i.e., aperture 18) over the color patches.

First, the number of patches on the chart, their geometry, and the spacing between two adjacent patches in terms of differences in x and y (Δx, Δy) are input into the computer, or derived from the computer application which printed the chart. Next, the operator positions pointer 19 of mouse 10 over two different patches of the printed chart. Over each patch, the operator hits one of switches 15 to indicate to the computer the reference position of its position sensing encoder on the chart surface. Using the reference position from each patch, the computer determines the x,y position of a target area on each of the two patches. This may involve the vector calculation described earlier. Also, which of the multiple patches on the chart the above two patches represent is preferably predefined by the computer. For example, the two patches may be defined as the patches at opposite ends of the first row of printed patches on the chart, or these two patches could have printed labels identifying them to the operator. Alternatively, the operator could indicate to the computer the row and column indexes of the two patches.

Based on the data inputted or derived by the computer mentioned above, and the x,y positions of the pointer over the two patches, the computer determines a target area over each of the multiple patches on the chart. By vector calculations defined earlier, the computer determines when aperture 18 is properly positioned within a predefined tolerance over the target area of each of the multiple patches. Accordingly, the operator can move mouse 10 over each of the color patches on the chart (without lifting the mouse off the chart surface) and the computer can indicate to the operator or automatically actuate spectrophotometer 16 when aperture 18 is properly positioned over the target area of each of the multiple patches. Using this procedure, accurate and repeatable positioning of the spectrophotometer in the mouse can be obtained at minimum expense, i.e., without an expensive X-Y motorized translation system. This procedure is more accurate and repeatable because after positioning the mouse over two different patches, the operator can scan the rest of the chart with the mouse using the computer to reliably positions the aperture of the spectrophotometer over the patches for spectral measuring. Information on the spectral measurements of the patches can then be used as needed for calibrating printing on the printer which produced the chart.

From the foregoing description it will be apparent that there has been provided an improved spectrophotometer mouse for making color spectrum measurements of desired areas on a surface. Variations and modifications of the herein described system and other applications for the invention will undoubtedly suggest themselves to those skilled in the art. Accordingly, the foregoing description should be taken as illustrative and not in a limiting sense.

What is claimed is:

1. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface said surface;

a spectrophotometer in said housing having an input for measuring the color spectrum of said target area on said surface;

means for locating said target area on said surface, wherein said locating means comprises a reference position finder for locating a reference position for the mouse in fixed relationship to said target area on said surface, and locating the position of said target area on said surface with respect to said reference position; and means for detecting when said input is substantially coincident with said located target area.

2. The spectrophotometer mouse according to claim 1 further comprising means for automatically actuating said spectrophotometer, responsive to said detecting means, when said input of said spectrophotometer is substantially coincident with said located target area.

3. The spectrophotometer mouse according to claim 1 wherein said position identifying means comprises means for providing information on the position of said mouse on said surface, and said locating means and detecting means operate responsive to said information.

4. The spectrophotometer according to claim 1 wherein said locating means further comprises a switch on said housing for enabling said reference position finder, and an indicator to said target area on said surface.

5. The spectrophotometer mouse according to claim 4 wherein said indicator comprises one of an external pointer on said housing to said target area, an external translucent projection from said housing having cross-hair indicia aligned over said target area, and a hole through said housing wherein said target area is visualizable.

6. The spectrophotometer according to claim 1 wherein said detecting means further comprises means for determining the position of said input of said spectrophotometer on said surface, and determining a vector to said position of said target area from the position of said input of said spectrophotometer.

7. The spectrophotometer mouse according to claim 1 wherein said detecting means further comprises means for detecting when an operator has moved said mouse to position said input of said spectrophotometer substantially coincident with said target area.

8. The spectrophotometer mouse according to claim 7 wherein said detecting means further comprises means for communicating to the operator when said input of said spectrophotometer is substantially coincident with said target area.

9. The spectrophotometer mouse according to claim 8 further comprising means for actuating said spectrophotometer.

10. The spectrophotometer mouse according to claim 7 wherein said detecting means further has means for communicating to the operator where said mouse is on said surface relative to said target area.

11. The spectrophotometer mouse according to claim 1 wherein said housing has a port facing said surface through which light from said target area is received to said input of said spectrophotometer.

12. The spectrophotometer mouse according to claim 1 wherein said position identifying means comprises at least one encoder ball in said housing rotatable over said surface.

13. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface;

a spectrophotometer in said housing having an input for measuring the color spectrum of said target area on said surface;

means for locating said target area on said surface; and means for detecting when said input is substantially coincident with said located target area, wherein said detecting means further comprises means for limiting the mouse to substantially linear movement.

14. The spectrophotometer mouse according to claim 13 further comprising means for automatically actuating said spectrophotometer, responsive to said detecting means, when said input of said spectrophotometer is substantially coincident with said located target area.

15. The spectrophotometer mouse according to claim 13 wherein said detecting means further has means for communicating to the operator when said input of said spectrophotometer substantially coincides with the target area through said aperture.

16. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface, wherein said position identifying means comprises an encoder ball and two parallel wheels in said housing which are independently rotatable over said surface, each said wheel having a sensor for detecting rotational displacement of said wheel;

a spectrophotometer in said housing having an input for measuring the color spectrum of said target area on said surface;

means for locating said target area on said surface; and means for detecting when said input is substantially coincident with said located target area.

17. The spectrophotometer mouse according to claim 16 further comprising means for automatically actuating said spectrophotometer, responsive to said detecting means, when said input of said spectrophotometer is substantially coincident with said located target area.

18. The spectrophotometer mouse according to claim 16 wherein said detecting means further comprises means for communicating to the operator when said input of said spectrophotometer is substantially coincident with said target area.

19. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface;

a spectrophotometer in said housing having an input for measuring the color spectrum of said target area on said surface;

means for locating said target area on said surface; and means for detecting when said input is substantially coincident with said located target area, wherein said position identifying means further comprises a tray having two parallel rails spaced apart to receive said housing and an aperture through which said target area is visualizable when said tray lies on said surface;

said locating means further comprises a reference position finder for locating a reference position of said mouse on the surface in fixed relationship to said target area when visualized through said aperture of said tray, and locating the position of said target area on said surface with respect to said reference position; and said detecting means having means for detecting when the operator has moved and the mouse along a linear path defined by said rails to position said input of said spectrophotometer substantially coincident with the target area through said aperture.

20. The spectrophotometer mouse according to claim 19 further comprising means responsive to said detecting means for actuating said spectrophotometer when said input of said spectrophotometer substantially coincides with the target area through said aperture.

21. The spectrophotometer mouse according to claim 19 wherein said detecting means further has means for communicating to the operator when said input of said spectrophotometer substantially coincides with the target area through said aperture.

22. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface;

a spectrophotometer in said housing having an input for measuring the color spectrum of said target area on said surface;

means for locating said target area on said surface; and means for detecting when said input is substantially coincident with said located target area, wherein said position identifying means comprises a tray shaped to receive said housing having an aperture substantially the same size as said input of said spectrophotometer through which said target area is visualizable when said tray lies on said surface, said aperture being located in said tray at a position where the aperture is substantially coincident with said input when said housing is received in said tray, whereby said tray identifies the position of said mouse on said surface to an operator when said housing is received in said tray.

23. The spectrophotometer mouse according to claim 22 further comprising means for actuating said spectrophotometer.

24. A spectrophotometer mouse for making color spectrum measurements of at least one target area on a surface over which the mouse is movable, said spectrophotometer mouse comprising:

a housing having a shape to conform to the hand of an operator;

means for identifying the position of said mouse on said surface;

a spectrophotometer in said housing having an input for measuring the color spectrum of said target area on said surface;

means for locating said target area on said surface; and means for detecting when said input is substantially coincident with said located target area, wherein said surface has a plurality of color patches which are separated from each other in a pre-defined arrangement, said locating means further comprises means for locating the target area with respect to each of said plurality of color patches, and said detecting means further comprises means for detecting when said input is substantially coincident with the target area of each of said plurality of color patches.

25. The spectrophotometer mouse according to claim 24 further comprising means, responsive to said detecting means, for activating said spectrophotometer when said input of said spectrophotometer is substantially coincident with the target area of each of said plurality of color patches.

26. A method for making color spectrum measurement of a target area on a surface using a spectrophotometer having an input for measuring the color spectrum of said target area on the surface, said method comprising the steps of:

providing a housing having a shape to conform to the hand of an operator;

identifying the position of said housing on said surface;

locating said target area on said surface, wherein said locating step further comprises the steps of locating a reference position for the housing in fixed relationship to said target area on said surface, and locating the position of said target area on said surface with respect to said reference position;

moving said housing on said surface to position said input of said spectrophotometer substantially coincident with said located target area; and detecting when said input is substantially coincident with said located target area.

27. The method according to claim 26 further comprising the step of automatically actuating, responsive to said detecting step, said spectrophotometer to make said measurement when said input of said spectrophotometer is substantially coincident with said target area.

28. The method according to claim 26 wherein said identifying step further comprises the step of providing information on the position of said housing on said surface, and said locating and detecting steps operate responsive to said information.

29. The method according to claim 26 wherein said detecting step further comprises the steps of determining the position of said input of said spectrophotometer on said surface, and determining a vector to said position of said target area from the position of said input of said spectrophotometer.

30. The method according to claim 26 wherein said detecting step further comprises the step of communicating to an operator of said mouse when said moving step has been carried out.

31. The method according to claim 30 further comprising the step of actuating said spectrophotometer after said communicating step has been carried out.

32. The method according to claim 26 wherein said detecting step further comprises the step of communicating to an operator of said mouse where said mouse is on said surface relative to said located target area.

33. A method for making color spectrum measurement of a target area on a surface using a spectrophotometer having an input for measuring the color spectrum of said target area on the surface, said method comprising the steps of:

providing a housing having a shape to conform to the hand of an operator;

identifying the position of said housing on said surface;

locating said target area on said surface;

moving said housing on said surface to position said input of said spectrophotometer substantially coincident with said located target area; and detecting when said input is substantially coincident with said located target area, wherein said detecting step further comprises the step of limiting the housing to substantially linear movement.

34. A method for making color spectrum measurement of a target area on a surface using a spectrophotometer having an input for measuring the color spectrum of said target area on the surface, said method comprising the steps of:

providing a housing having a shape to conform to the hand of an operator;

identifying the position of said housing on said surface;

locating said target area on said surface;

moving said housing on said surface to position said input of said spectrophotometer substantially coincident with said located target area; and detecting when said input is substantially coincident with said located target area, wherein said surface has a plurality of color patches which are separated from each other in a pre-defined arrangement, said located step further comprises the step of locating the target area with respect to each of said plurality of color patches, and said detecting step further comprises the step of detecting when said input is substantially coincident with the target area of each of said plurality of color patches.

35. The method according to claim 34 further comprising the step, responsive to said detecting step, for activating said spectrophotometer when said input of said spectrophotometer is substantially coincident with the target area of each of said plurality of color patches.

36. A system for making color spectrum measurements with a mouse device of one or more areas on a surface over which said mouse device is movable comprising:

a housing having a shape to conform to the hand of an operator;

a pointer on said housing for enabling said operator to select a target area on said surface;

a spectrophotometer in said housing for measuring components of the color spectrum of said areas on said surface, said spectrophotometer comprising an input facing said surface when said housing is disposed thereon said target area for viewing light therefrom;

means for identifying on said surface a reference position for said mouse and the positions of said target area and said input based on said reference position;

means for tracking the position of said mouse on said surface relative to the position of said target area;

means for determining when the operator has moved said housing along a path which positions said input of said spectrophotometer substantially coincident with said target area; and means for communicating to said operator when said housing has been moved along said path.

37. The system according to claim 36 further comprising means, responsive to said determining means, for actuating said spectrophotometer when said input of said spectrophotometer is substantially coincident with said target area.

38. The system according to claim 36 wherein said input comprises an aperture in a side of said housing facing said surface when said mouse is disposed thereon.

39. The system according to claim 36 wherein said surface has a plurality of color patches which are separated from each other in a pre-defined arrangement, and said identifying means identifies the reference position for said mouse with respect to two different ones of said plurality of patches, and responsive to these reference positions determines a target area over each said plurality of patches.

40. The system according to claim 39 further comprising means, responsive to said determining means, for actuating said spectrophotometer when said input of said spectrophotometer is substantially coincident with the target area over each of said plurality of patches.

* * * * *

UNITED STATES PATENT AND TRADEMARK OFFICE
CERTIFICATE OF CORRECTION

PATENT NO. : 5,701,175
DATED : December 23, 1997
INVENTOR(S): David A. Kostizak and James M. Zavislan It is certified that error appears in the above-identified patent and that said Letters Patent is hereby corrected as shown below:

Col. 10, line 15, cancel "said surface"

Col. 12, line 10, cancel "and"

Signed and Sealed this

Third Day of November, 1998

*Attest:*

BRUCE LEHMAN

*Attesting Officer*     *Commissioner of Patents and Trademarks*